United States Patent Office 2,874,279
Patented Feb. 17, 1959

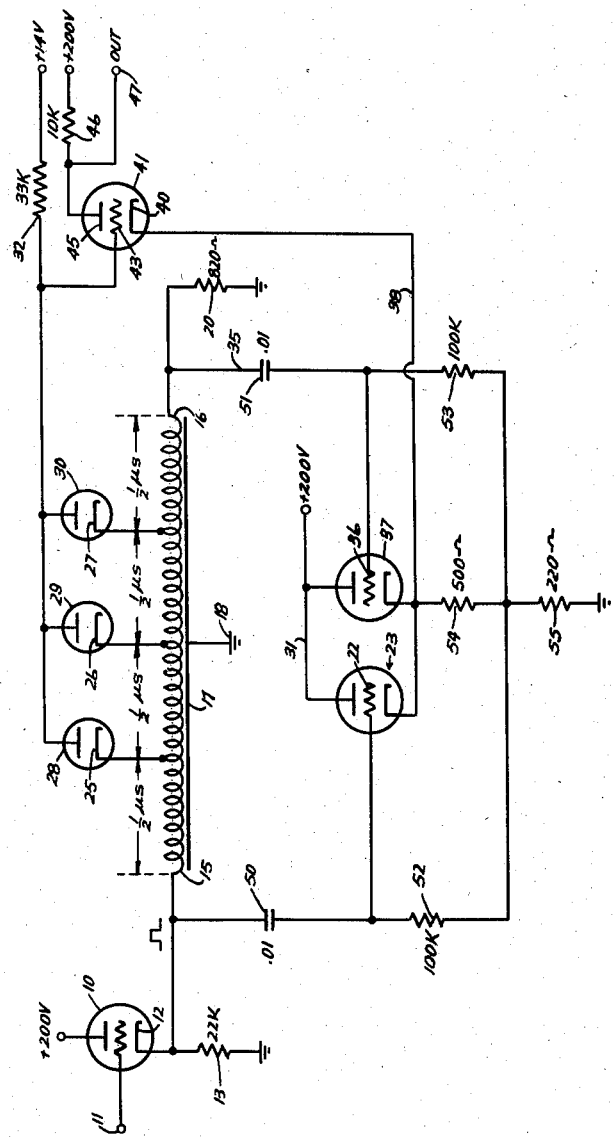

2,874,279

PULSE SELECTOR CIRCUIT

Meritt Lavon Miller, Fort Wayne, Ind., assignor to International Telephone and Telegraph Corporation, a corporation of Maryland Application August 6, 1952, Serial No. 302,984

10 Claims. (Cl. 250—27)

This invention relates generally to a pulse selector circuit and particularly to a circuit of that type which effects noise suppression during pulse reception.

A primary object of the invention resides in the provision of an improved pulse selector circuit of the type adapted to accept a signal comprising pulses of predetermined lengths which may be accompanied by pulses of other lengths and noise, and reject the noise component together with pulses of less than minimum and greater than maximum length while passing acceptable pulses therethrough as an output signal.

Another object of the invention is to provide improvements in a pulse selector circuit substantially to improve signal to noise ratio.

Still another object is to employ in a pulse selector circuit the advantages of a delay line, having associated therewith a plurality of normally conducting diodes in a manner to discriminate against both pulses of less or more than an acceptable length, and against extraneous noise such as static received with the pulses.

Other objects and advantages of the invention will become apparent to persons skilled in the art upon examination of the drawings, the specification and the claims appended thereto.

In the drawing, in which like parts are identified by the same reference numerals:

The single figure schematically illustrates a circuit employing the principles of the invention.

Referring to the figure, an input tube, generically designated 10 is illustrated as a triode. For the purpose of illustrating a specific circuit, values of components are shown on the circuit diagram, it being understood that such values may differ widely in other instances, and the modifications of circuitry will be apparent to persons skilled in the art. A signal, which may contain pulses both below and above an acceptable length, together with noises which may tend to distort the pulses, is applied in the usual manner to the control grid terminal 11 of tube 10, which may be of the 5718 type for component values given. The signal is fed from the circuit of cathode 12 which includes a conventional cathode follower resistor 13 connected to ground, to a delay line generically represented at 15, shown in the conventional manner as constituting an inductance illustrated by coil 16 and a distributed capacitance represented by shield 17, parallel to coil 16. A lumped constant type line is preferably employed, but line 15 may be of the coaxial type, with the outer conductor grounded as shown at 18, coil 16 representing the central electrode with the left end connected to grid 22 of the cathode-coupled triode 23 for a purpose later described, and the right end grounded through resistor 20.

The central electrode is center-tapped, and each half thereof also center-tapped, delay times selected for the specific circuit discussed being shown, the taps being respectively led to the cathodes 25, 26 and 27 of diode rectifiers 28, 29 and 30, the anodes thereof being interconnected by a line which leads through a dropping resistor 32 to a suitable source of positive voltage, such as the 14 volts shown. The outer end of the delay line 15 which leads through resistor 20 to ground, also leads through line 35 to the grid 36 of a vacuum tube 37 shown as a triode, tubes 23 and 37 being of the 5718 type in the present example, cathode-coupled in common with tube 23, by line 38 to the cathode 40 of output tube 41, the grid 43 of which is maintained at the potential of anodes of the diode rectifiers 28, 29 and 30, from the 14 volt source. Anode 45 of tube 41, which may be of the 5719 type, is connected to a suitable source of positive voltage through a resistor 46, a 200 v. source shown, the output signal from the tube being taken from the anode 45 as shown by terminal 47. Blocking condensers 50, 51, and dropping resistors 52, 53 and cathode resistors 54, 55 may be of values shown for the specific circuit.

The operation of the circuit shown is as follows: The anodes of diodes 28, 29 and 30 are maintained at a sufficient potential from the source, shown as 14 volts, connected to resistor 32 to ensure conductance through the diodes and current flow through resistor 20 to ground in the absence of an input signal. Assuming that a positive pulse of acceptable length, less than the delay line length but of sufficient length to span the diodes, is fed from cathode 12 of tube 10 to delay line 15, hence simultaneously to grid 22 of tube 23, and that the pulse is of sufficient magnitude to swing tube 23 from a normally non-conducting state to a state of conductance, the resulting cathode current initiated in tube 23 establishes a potential across resistors 54 and 55 positive with respect to ground to raise the potential of cathode 40 of tube 41 with respect to ground to cut-off that tube during the passage of the pulse into the delay line.

Upon passage of the trailing edge of the pulse into delay line 15, grid 22 returns negative to cut-off the tube 23 and to remove the positive potential at cathode 40 of tube 41, thus swinging tube 41 to conductance to initiate the leading edge of an output signal, providing, however, that upon passage of the trailing edge of the pulse into the delay line 15, the leading edge has not passed completely through the line. In the event the pulse is longer than the delay line hence unacceptable, prior to the passage of the trailing edge thereof into the line 15, the leading edge swings grid 36 of tube 37 positive to initiate conduction therein to cut-off tube 41 in the same manner as effected by tube 23, hence no output signal is obtained from tube 41. The circuit constants are so chosen that the change in potential at grid 43 of tube 41 in response to cut-off of all diodes 28, 29 and 30 renders tube 41 conductive only when both tubes 23 and 37 are cut-off. If the pulses of acceptable length, i. e., shorter than the delay time of line 15, which in the present instance is illustrated as having a total time delay of two microseconds, be of sufficient length to straddle diodes 28, 29 and 30, i. e. a minimum length of one and one-half microseconds, such a pulse, as it travels down the delay line 15, will sequentially raise the potential of the cathodes 25, 26 and 27 of respective diodes 28, 29 and 30 to terminate normal conduction in each diode respectively. When the pulse brackets the diodes, current flow through resistor 20 to ground is terminated, hence the sharp rise in positive potential at grid 43 renders tube 41 conductive, cathode 40 being connected to ground through resistors 54 and 55 and no current passing therethrough from either tube 23 or 37.

As the trailing edge of the pulse passes cathode 25 of diode 28, conduction is re-established to terminate the output signal from tube 41. It is thus seen that the output signal is of necessity shorter than the input signal, but that signal noise components accompanying the pulses fed to line 15 are dissipated through resistor 20 to ground, hence eliminated from the newly initiated output signal.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a device of the character described, a delay line including an input end and adapted to receive pulses and a grounded output end, a plurality of unidirectional current conducting devices individually connected to said line at spaced intervals and to a source of potential sufficient to establish conduction between said source and ground in the absence of an input signal, said individual connections being spaced a predetermined distance from said input end, an output circuit including an electron discharge device having a cathode, an anode, and a control element, means connecting said control element to said source of potential, means connected respectively with the input and output ends of said delay line to block said electron discharge device in response to the arrival of the leading edge of a signal at either the input or the output end of said line and to unblock said device by passage of the trailing edge of a pulse into or out of said line, whereby pulses of shorter length than the delay time of said line but of sufficient length to straddle said plural unidirectional devices to effect, when completely within said line and straddling said unidirectional devices, a signal from said output circuit by terminating conduction of said unidirectional devices to unblock said output device, said output signal being terminated upon passage of the trailing edge of said pulse over the first unidirectional device to re-establish conduction therein, and block said output device.

2. In a pulse discriminator circuit, a delay line including input and output ends, means for establishing a potential in response to the passage of the leading edge of a pulse and for terminating said potential in response to passage of the trailing edge of said pulse, means for feeding pulses to one end of said line, a plurality of rectifiers respectively connected between points spaced along the length of said line and a source of potential, means connecting the output end of said delay line to ground to establish current flow from said potential source through said rectifiers to ground, an output tube including a cathode, an anode and a control element, means operatively connecting said cathode to said line through said potential establishing means to block said tube during passage of a signal into or out of said line, means connecting said control element to said rectifier potential source, and means connecting said anode to a separate source of potential, whereby a pulse of sufficient length to straddle said rectifiers but shorter than the delay time of said line initiates an output signal from said output tube.

3. A noise suppression circuit having in combination, a delay line having an input end and an output end, means for introducing a signal to said delay line, a rectifier operatively coupled to said line, an output control tube, vacuum tube means connected between the input end of said line and said output tube to render said output tube blocked during passage of a pulse into said line, vacuum tube means operatively coupled to the output end of said line to render said output tube blocked during passage of a pulse out of said line, and means operatively coupled to said rectifier and responsive to the termination of conduction in said rectifier by a pulse as it passes along said line to unblock said output tube and initiate an output signal therefrom.

4. A noise suppression circuit having in combination, a delay line having an input end and an output end, means for introducing a signal to said delay line, a rectifier coupled to said delay line, an output control tube, vacuum tube means connected between the input end of said line and said output tube to render said output tube blocked during passage of a pulse into said line, vacuum tube means associated with the output end of said line to render said output tube blocked during passage of a pulse out of said line, and means operatively coupling said rectifier to said output tube whereby termination of conduction in said rectifier by a pulse as it passes along said line serves to unblock said output tube and cause the initiation of an output signal therefrom.

5. In a pulse discriminator circuit, a delay line, means for feeding an input signal to one end of said delay line, an output circuit including an electron discharge device having a cathode, an anode, and control element, a plurality of diodes connected to said delay line at spaced intervals along the length thereof, means grounding the opposite end of said delay line, means series connecting said diodes to a source of positive potential of a magnitude to establish conduction therein and current flow from said source through said line to ground in the absence of an input signal, means connecting said source of positive potential to the control element of said discharge device, second and third electron discharge devices, each including an anode, a cathode and a control element, means connecting the control elements of said second and third devices to the opposite ends respectively of said delay line, means cathode coupling said second and third devices to said first device, whereby the leading edge of an input pulse fed to said line unblocks the discharge device associated therewith to effect blocking of said output device, said leading edge, when passed through said line, unblocking the device associated therewith to effect in like manner blocking of said output device, the trailing edge of pulses passed through said line and of a length less than the delay time thereof permitting unblocking of said output device while moving completely within said line, the leading edge of said pulse successively rendering said diodes non-conducting upon passage through the line, pulses of a length to straddle said diodes effecting termination of current flow between said positive source and ground to lower the control element potential of said first device and initiate conduction therein productive of an output signal, said output signal being terminated upon passage of the trailing edge of said pulse over the first of said diodes to re-establish conduction therein and return said first device to a blocked condition.

6. A circuit of the character described comprising a delay line, a plurality of diodes having cathode and anode elements respectively, one set of common diode elements being connected together, the other set of common diode elements being connected to said delay line at spaced apart points, a signal circuit having a control element coupled to said one set of diode elements, said signal circuit being operative to produce a signal in response to a change in potential on said control element, said diodes conjointly producing a change in potential in response to a signal on said delay line which brackets all of said other set of diode elements, and means for disabling said signal circuit in response to a signal which is longer than said delay line.

7. A circuit of the character described comprising a delay line, a plurality of diodes having cathode and anode elements respectively, one set of common diode elements being connected together, the other set of common diode elements being connected to said delay line at spaced apart points, a signal circuit having a control element coupled to said one set of diode elements, said signal circuit being operative to produce a signal in response to a change in potential on said control element, a source of unidirectional voltage coupled to both said control element and said one set of diode elements, said diodes conjointly producing a change in potential in response to a signal on said delay line which brackets all of said other set of diode elements, and means for disabling said signal circuit in response to a signal which is longer than said delay line.

8. A circuit of the character described comprising a delay line, a plurality of diodes having cathode and anode elements respectively, one set of common diode elements being connected together, the other set of common diode elements being connected to said delay line at spaced apart points, a signal circuit having a control element coupled to said one set of diode elements, said signal circuit being operative to produce a signal in response to a change in potential on said control element, a source of unidirectional voltage coupled to both said control element and said one set of diode elements, said diodes conjointly producing a change in potential in response to a signal on said delay line which brackets all of said other set of diode elements, and a circuit operatively coupled to the opposite end portions of said delay line and to said control element for disabling said signal circuit in response to a signal which is longer than said delay line.

9. The circuit of claim 8 wherein the anode elements of said diodes constitute said one set of elements and the cathode elements constitute said other set.

10. A pulse discriminator circuit having in combination, a delay line having an input end and an output end, means for introducing a signal to said delay line, a non-linear impedance device operatively coupled to said delay line, an output control device having at least three elements including a control element, a second control device having at least three elements including a control element with its control element and another element coupled between the input end of said delay line and one of the elements of said output control device to render the same blocked during passage of a pulse into said delay line, a third control device having at least three elements including a control element with its control element and another element coupled between the output end of said delay line and said one element of said output control device to render the same blocked during passage of a pulse out of said delay line, and means operatively coupled to said non-linear impedance device and to said output control device and responsive to passage of a pulse along said delay line to unblock said output control device and thereby initiate an output signal therefrom.

References Cited in the file of this patent

UNITED STATES PATENTS

| | | |
|---|---|---|
| 2,211,942 | White | Aug. 20, 1940 |
| 2,236,134 | Gloess | Mar. 25, 1941 |
| 2,266,154 | Blumlein | Dec. 16, 1941 |
| 2,482,544 | Jacobsen | Sept. 20, 1949 |
| 2,499,613 | Thompson | Mar. 7, 1950 |
| 2,570,221 | Earp et al. | Oct. 9, 1951 |
| 2,648,766 | Eberhard | Aug. 11, 1953 |
| 2,736,801 | Wiegand et al. | Feb. 28, 1956 |

UNITED STATES PATENT OFFICE

CERTIFICATE OF CORRECTION

Patent No. 2,874,279 February 17, 1959

Meritt Lavon Miller

It is hereby certified that error appears in the printed specification of the above numbered patent requiring correction and that the said Letters Patent should read as corrected below.

Column 3, line 9, strike out "and", first occurrence; lines 30 and 34, for "output", each occurrence, read -- electron discharge --.

Signed and sealed this 30th day of June 1959.

(SEAL)

Attest:
KARL H. AXLINE
Attesting Officer

ROBERT C. WATSON
Commissioner of Patents